US009474289B2

(12) United States Patent
Döring

(10) Patent No.: US 9,474,289 B2
(45) Date of Patent: Oct. 25, 2016

(54) PROCESS FOR PRODUCING LOW MICROBIAL COUNT MILK PRODUCTS

(71) Applicant: DMK Deutsches Milchkontor GmbH, Zeven (DE)

(72) Inventor: Sven-Rainer Döring, Zeven (DE)

(73) Assignee: DMK Deutsches Milchkontor GmbH, Zeven (NL)

(*) Notice: Subject to any disclaimer, the term of this patent is extended or adjusted under 35 U.S.C. 154(b) by 0 days.

(21) Appl. No.: 14/789,259

(22) Filed: Jul. 1, 2015

(65) Prior Publication Data

US 2016/0000100 A1    Jan. 7, 2016

(30) Foreign Application Priority Data

Jul. 2, 2014  (EP) ..................................... 14175375

(51) Int. Cl.
| | | |
|---|---|---|
| A23C 3/02 | (2006.01) | |
| A23C 3/04 | (2006.01) | |
| A23C 9/14 | (2006.01) | |
| A23C 3/037 | (2006.01) | |

(52) U.S. Cl.
CPC ................ *A23C 3/02* (2013.01); *A23C 3/037* (2013.01); *A23C 3/04* (2013.01); *A23C 9/14* (2013.01)

(58) Field of Classification Search
CPC ........... A23C 3/02; A23C 3/04; A23C 3/037
USPC ................................ 426/491, 495, 522, 580
See application file for complete search history.

(56) References Cited

U.S. PATENT DOCUMENTS

| | | | | |
|---|---|---|---|---|
| 2,870,027 A | * | 1/1959 | Romero ................. | A23C 3/005 426/404 |
| 4,515,823 A | * | 5/1985 | Kirschenmann ......... | A01J 11/10 165/66 |
| 6,165,532 A | * | 12/2000 | Mutti ................... | A23C 3/0375 426/511 |

FOREIGN PATENT DOCUMENTS

DE    100 36 085 C1    1/2002

OTHER PUBLICATIONS

Hammershøj et al, "Instant infusion pasteurisation of bovine milk, II. Effects on indigenous milk enzymes activity and whey protein denaturation," International Journal of Dairy Technology, vol. 63, No. 2, May 1, 2010, pp. 197-208.
Andersen, "Instant and high-heat infusion," Thermal technologies in fold processing, Jan. 1, 2001, Taylor & Francis, Chapter 12. pp. 229-240.
"The Premium Benefits of Steam Infusion UHT Treatment," www.spx.com/en/multimedia-library/pdf/spx-brand-pdf/flow/apv/News_Event/2012_10_29_Steam_Infusion_Editorial.pdf, Oct. 1, 2014, pp. 1-7.

* cited by examiner

*Primary Examiner* — Helen F Heggestad
(74) *Attorney, Agent, or Firm* — Dilworth & Barrese, LLP

(57) ABSTRACT

A process is proposed for producing low microbial count whole milk products, in which (a1) optionally, the milk product from which microbes are to be removed is subjected to a heat pre-treatment in a heat exchanger and warmed to temperatures in the range from 25 to 30° C., (a2) the optionally pre-treated milk product is heated by infusion to temperatures from 50 to 75° C., and pasteurized in the course thereof, and (a3) the pasteurized product is cooled by flash cooling.

A similar method is likewise disclosed for producing low microbial count skimmed milk products which, as the most important intermediate step, further additionally contains the process of separating off the cream.

18 Claims, 3 Drawing Sheets

PROCESS FOR PRODUCING LOW MICROBIAL COUNT MILK PRODUCTS

FIELD OF THE INVENTION

The invention is in the field of milk products and relates to an improved process for the microbial removal therefrom.

PRIOR ART

Pasteurization denotes the short-time heating of liquid or paste-form foods to temperatures up to 100° C. for killing off microorganisms. It serves for preserving, inter alia, milk, juices and vegetable juices and other liquids. Owing to the short time period of the action of heat and the moderate temperature, the nutritional value, taste and consistency of the food are only changed insignificantly, and nevertheless most food spoilage organisms such as lactic acid bacteria and yeast and many pathogenic bacteria such as salmonelli are reliably killed off. Heat-resistant bacterial spores, such as those of *Clostridium botulinum*, the causative organisms of paratuberculosis and also mould fungal spores survive this treatment at least in part. For this reason, the content of microorganisms of the raw good should be kept as low as possible. Pasteurization of milk is the best known, which for this purpose is heated for 15 to 30 seconds to 72 to 75° C. and thereafter is immediately cooled down again. Pasteurized milk remains palatable for about 6 to 10 days stored unopened at 6 to 7° C. In Germany and the EU, according to the milk hygiene directive, pasteurization is legally prescribed for all treated milk types except for raw milk and certified milk.

In the pasteurization of milk, usually plate heat exchangers are used. However, owing to combustion processes deposits form, on which, at temperatures from 30 to 55° C., thermally resistant microbes grow rapidly and readily; the same applies to dead spaces in the exchangers. The microbes can double within 20 minutes each time and thus populations of 6 million germs/ml can easily form. Apart from the hygiene deficit, the microbes can lead, for example, to malformations in cheese production owing to gas formation. Entire cheese loaves in this case can inflate in a similar manner to air balloons. Owing to release of enzymes, sensory defects can also occur.

The usual pasteurization proceeds along the following plan: the raw milk is heated in the first heat exchanger for 30 to 45 seconds from 6 to 55° C. In the separator, the cream is then separated off at this temperature within 5 to 10 seconds. Then the skimmed milk is heated to 72° C. within 15 to 30 seconds and pasteurized at this temperature in the second heat exchanger. In the course of 45 to 60 seconds, the pasteurized milk is then cooled down again to 8° C. In total, however, the milk remains for a comparatively long time period in the critical temperature window from 35 to 55° C. in which microbial growth takes place.

These microbes cannot be cured by the pasteurization. Also, the flow velocity in the components is restricted, and so it is not possible to flush out the microbes. One alternative would be ultra-heat treatment, but in this case the milk proteins would be denatured, and so it does not come into consideration.

Processes are known from the prior art in which some of the microbes are removed by microfiltration processes even before the pasteurization, and in this manner give the impression that particularly low microbial count products would be obtained. For instance, as a representative of a great number of similar documents, EP 1656030 B1 (PARMALAT), for example, discloses a process in which the pasteurization is placed upstream of a filtration through a narrow-pored membrane, in which the permeate is reused and the bacteria-loaded retentate is discarded. For the problem described at the outset, however, this does not mean a solution, since the low microbial count in the permeate is still so high that, under the conditions which prevail during the treatment in the heat exchanger, they can still grow so intensively that a considerable microbial loading is again the consequence.

US 2002 012732 A1 (LINDQUIST) discloses a process in which a skimmed milk is subjected to filtration and a permeate and a retentate are obtained. Whereas the permeate is subjected to a heat treatment, the retentate is filtered a second time and the resultant second permeate is added to the first permeate. The process, however, proves to be much too complex in practice.

The subject matter of U.S. Pat. No. 6,372,276 B1 (LINDQUIST) is a process for generating a sterile milk in which raw milk is first filtered and the resultant permeate is then heat-treated in a plurality of stages. In this process procedure, however, a frequent blockage of the membranes is observed, which leads to constant interruptions in the continuous process sequence, in addition the microbial counts are insufficiently reduced. On the contrary, here, growth on the membranes is observed, since no competing flora is present, and the microbial count increases exponentially.

DE 10 2009 006248 A1 (GEA) discloses a device in an infusion system for a food product, in particular a dairy product such as milk, cream or yoghurt, which contains an infusion chamber limited by an infuser container having a conical base and having a first inlet for the food product that is to be heated in the upper region of the infusion chamber and having an outlet for the heated food product in the lower region thereof. In this case, the product inlet is provided in such a manner that the food product entering into the infusion chamber is subdivided in the form of small droplets or as a film flow, and the infusion chamber passes through as a falling flow and wherein the infusion chamber contains a second inlet for steam in the upper region thereof which is provided in such a manner that the food product that is to be heated comes into contact with the steam in a heat exchange over the entire residence time in the infusion chamber of said food product that is to be heated.

The object of the present invention was therefore to provide an alternative process for reliable microbial removal from milk products, especially from whole milk and skimmed milk products, which is free from the disadvantages described at the outset.

DESCRIPTION OF THE INVENTION

A first subject matter of the invention relates to a process for producing low microbial count whole milk products, in which
(a1) optionally, the milk product from which microbes are to be removed is subjected to a heat pre-treatment in a heat exchanger and warmed to temperatures in the range from 25 to 30° C.,
(a2) the optionally pre-treated milk product is heated by infusion to temperatures from 50 to 75° C., and pasteurized in the course thereof, and
(a3) the pasteurized product is cooled by flash cooling.

A second subject matter of the invention relates to a similar process for producing low microbial count skimmed milk products, in which (b1) optionally, the milk product from which microbes are to be removed is subjected to a heat pre-treatment in a heat exchanger and warmed to temperatures in the range from 25 to 30° C., (b2) the optionally pre-treated milk product is heated by a first infusion to temperatures from 50 to 60° C., (b3) the cream is separated off, (b4) the skimmed milk product is heated by a second infusion to temperatures from 50 to 75° C. and pasteurized in the course thereof, and (b5) the pasteurized product is cooled by flash cooling.

Both processes can be run continuously or batchwise.

The two processes are connected by the same inventive concepts and only differ in that, in the first case, a whole milk is obtained and, in the second case, a skimmed milk is obtained. However, the process is also suitable in principle for all other milk products which require pasteurization.

Surprisingly, it has been found that, owing to the combination of infusion and flash cooling, the problem of the long residence time in the temperature range advantageous for microbial growth between 30 and 55° C., and in particular 35 to 50° C., may be markedly reduced. Whereas usual pasteurization processes require a time between 1 and 2 minutes, this time span, according to the present invention, may be reduced by a factor of 2 to 4. In this manner, the microbial loading of milk products may be markedly reduced.

BRIEF DESCRIPTION OF THE DRAWINGS

The present invention will be described in greater detail with reference to the accompanying drawings in which.

DETAILED DESCRIPTION OF THE INVENTION

Pre-Warming

In a first optional, although preferred, step, the raw milk, which usually has a temperature between 5 and 10° C., is subjected to a pre-warming. This can proceed in usual plate heat exchangers, wherein warming to about 25° C. takes place in the course of about 10 to about 30 seconds.

Infusion

The first essential step of the process according to the invention is to shorten the critical heating operation, i.e. the slow passage through a temperature range in which mesophilic and thermophilic spores find optimum growth conditions, by a flash-like heating. This is achieved by infusion (or synonymously: steam infusion), in which super-heated steam is condensed on the surface of the milk product and this is heated abruptly. This process is differentiated from steam injection (Direct Steam Injection), that is to say in that the steam does not pass through the product, but solely remains on the surface.

The process of (steam) infusion has been known since the 1960s. In principle, the heating can be carried out in two steps, wherein the good that is to be heated is sprayed into a pressure chamber filled with super-heated steam and the heating or pasteurization is performed on the falling path of the droplets.

Figure 1:
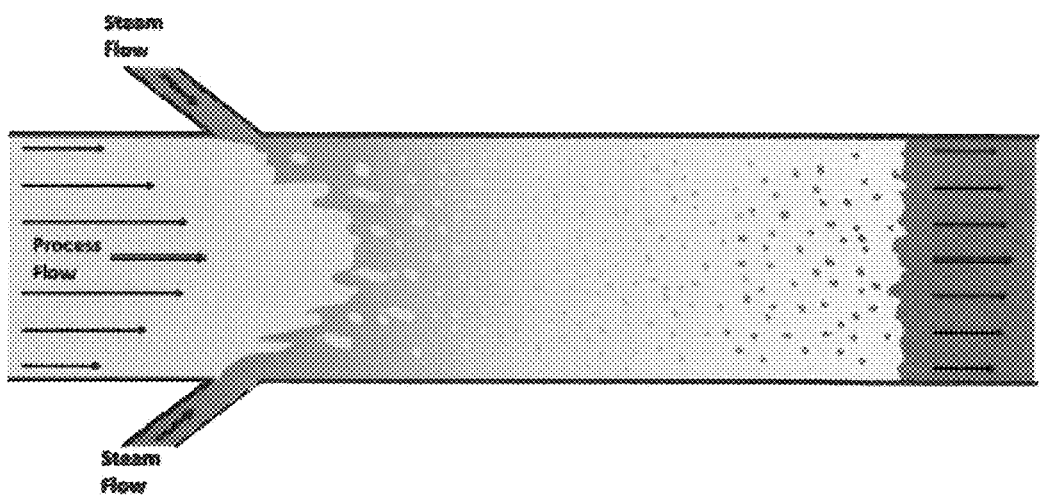
FIG. 1 illustrates a diagrammatic sequence of steam infusion.

Since the year 2000, however, what is termed the PDX process has increased in importance, which is shown schematically in FIG. 1. In this case, the good that is to be heated is vaporized and heated abruptly in a stream of super-heated steam. The steam stream moving forward at supersonic velocity divides the product droplets homogeneously, and so a multi-phase stream is formed, wherein the heating takes place in a gentle manner only on the boundaries of the droplets. In this manner, at the same time, condensation of the droplets is effected. The steam can in this process have a temperature from about 100 to about 250° C., and in particular about 120 to about 150° C., and the infusion requires a time of typically 1 to 5, and in particular about 2 to 3, seconds.

Figure 2:
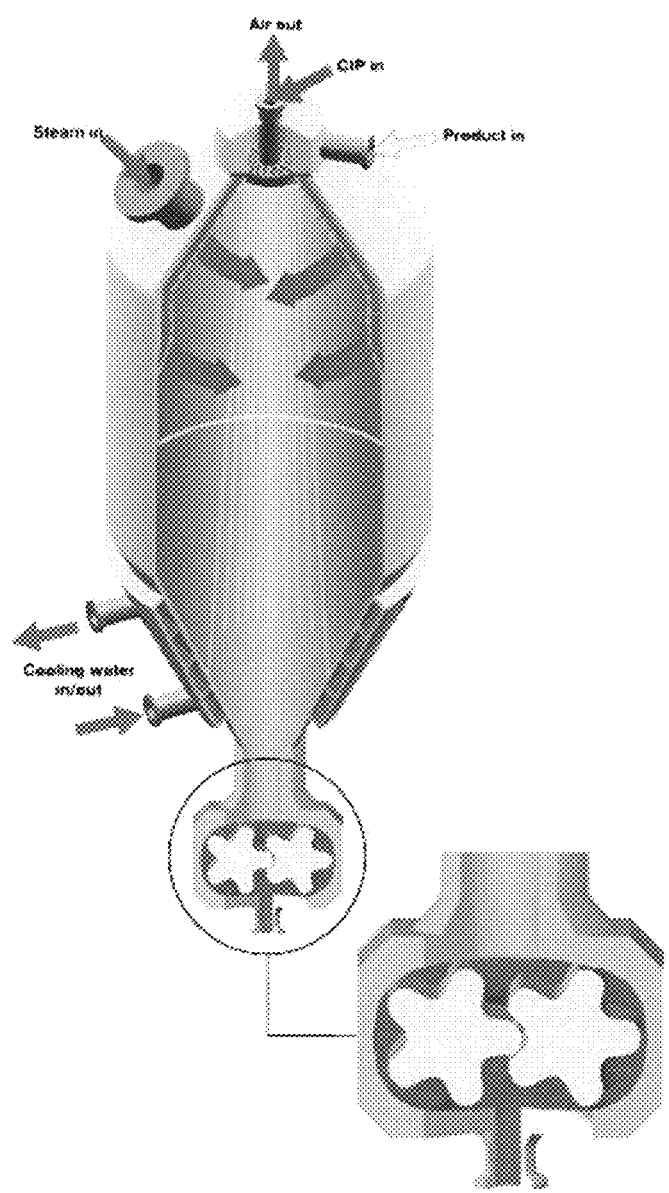
FIG. 2 illustrates an infusion reactor.

In FIG. 2, a typical infusion device is shown. Here, the special character is that the infusion chamber is provided at the outlet with a gearwheel pump with which the heated product can be transported out at high velocity, in order that no adherent deposits form. Such a device is offered on the market, for example, by SPX Corp. Further infusion containers can also be obtained, as stated at the outset, from GEA, and are described by way of example in German patent application DE 10 2010 008448 A1 (GEA).

In a further preferred embodiment, the infusion heating is performed in such a manner that product and steam are sprayed alternately into a reactor via concentric ring nozzles in such a manner that a steam pressure gradient is formed from the inside to the outside. As a result, the droplets are kept away from the wall and cannot burn.

The description of the infusion applies in each case for the steps (a2), (b2) and (b4).

Skimming

The milk is skimmed when skimmed milk is to be produced. For this purpose, it has proved advantageous to separate off the cream (about 4% by wt. of the total mass of raw milk) at temperatures that are not too high and in this case preferably do not exceed 60° C., because otherwise losses in quality occur. This process step can be carried out in standard separators which are sufficiently known from the prior art. Separators from GEA Westfalia Separator GmbH are widespread in the milk industry (http://www.westfalia-separator.com/de/anwendungen/molkereitechnik/milch-molke.html). Corresponding components are also described, for example, in DE 10036085 C1 (Westfalia) and are very well known to those skilled in the art, and so no explanations are required for carrying out these process steps, since they are considered to be part of general specialist knowledge.

Flash Cooling

A second essential step of the process according to the invention is also to pass through the temperature range critical for microbial growth as rapidly as possible during cooling. For this purpose, flash cooling has proved to be particularly effective.

The expression flash cooling is taken to mean a process in which the hot liquid product is "flashed" under turbulent flow conditions into a reactor that is at reduced pressure, in such a manner that the boiling point of the water is lowered below 30° C. For support, the shell of the flash reactor can additionally be further cooled. A corresponding process description based on cooling a polymer preparation is described, for example, in EP 1116728 B1 (WOLFF CELLULOSICS).

The cooling of the pasteurized whole milk or skimmed milk, as is provided in steps (a3) and (b5), requires about 1 to 5 seconds, wherein the final temperature is usually about 25 to about 30° C.

After-Cooling

If the shell of the flash reactor is additionally cooled, the exit temperature of the pasteurized milk can be below 10° C. In this case, a further cooling stage is not necessary. If the milk leaves the reactor as is typical at about 25° C., the, however, preferably further cooling to about 5 to 10° C. follows, which again can proceed in a plate heat exchanger, because, under these conditions, no growth of unwanted microbes is observed.

EXAMPLES

Example 1

Production of Pasteurized Skimmed Milk

Raw milk was cooled to 6° C. and using a plate heat exchanger was warmed in the course of 15 seconds to 25° C. The pre-warmed milk was heated by a first infusion in the course of 1 second to 55° C., and then passed into a separator in which the cream was separated off. The skimmed milk was heated by a second infusion in the course of 2 seconds to 72° C. and pasteurized. Then, the pasteurized milk was sprayed with turbulent flow into a reactor and the pressure in the course of this reduced to the extent that the product cooled in the course of 5 seconds to 25° C. The exiting product was then cooled in a plate heat exchanger to 8° C. The resultant skimmed milk was virtually free from mesophilic and thermophilic spores.

Comparative Example C1

Production of Pasteurized Skimmed Milk

Figure 3:
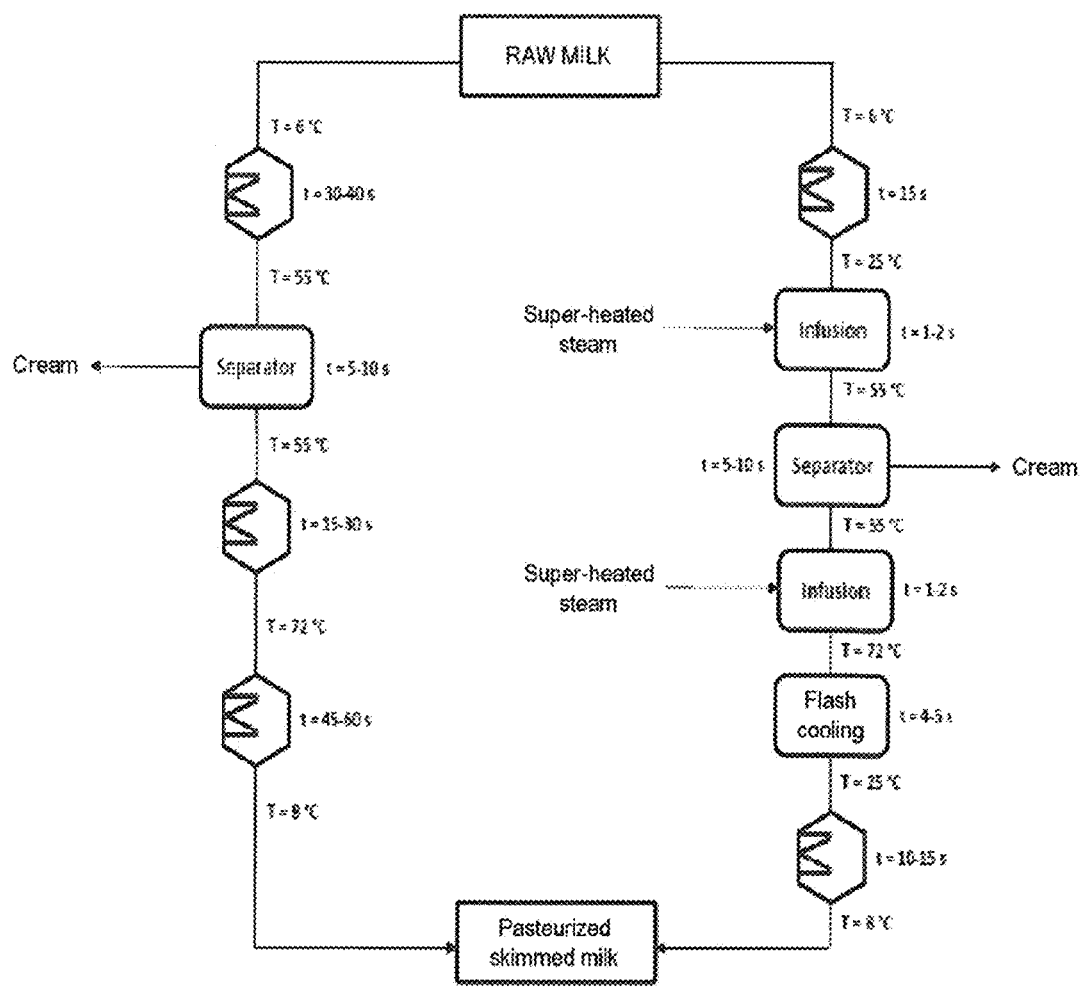
FIG. 3 illustrates a flow chart for producing pasteurized skimmed milk products, with the left side illustrating classical production and the right side illustrating production according to the invention.

Raw milk was cooled to 6° C. and warmed to 55° C. in the course of 40 seconds using a plate heat exchanger. The pre-warmed milk was passed into a separator in which the cream was separated off. The resultant skimmed milk was heated to 72° C. in the course of 15 seconds in a second plate heat exchanger and pasteurized. Then, the pasteurized milk was cooled to 8° C. in a third heat exchanger. Although the resultant skimmed milk was within the EU specification, it had around 500 mesophilic and thermophilic spores per ml. The two processes are compared with one another in the following FIG. 3, again with reference to a flow diagram.

The invention claimed is:

1. A process for producing low microbial count milk products, comprising the followings steps:
    (a1) subjecting a milk product to be reduced in microbes to a temperature treatment in a heat exchanger and heating to temperatures in the range from about 25 to about 30° C. for about 10 to about 30 seconds,
    (a2) heating and simultaneously pasteurizing the product of step (a1) to about 50 to about 75° C. via steam infusion, and
    (a3) cooling the pasteurized product is of step (a2) by flash cooling.

2. The process according to claim 1, conducted continuously.

3. The process according to claim 1, conducted batchwise.

4. The process according to claim 1, wherein the milk product is heated in a plate heat exchanger (step a1).

5. The process according to claim 1, wherein the infusion is carried out using super-heated steam (step a2) which has a temperature from about 100 to about 250° C.

6. The process according to claim 1, wherein the infusion (step a2) is carried out over a period from about 1 to about 5 seconds.

7. The process according to claim 1, wherein the pasteurized product (step a3) is cooled over a period from about 1 to about 5 seconds.

8. The process according to claim 1, wherein the pasteurized product (step a3) is cooled to a temperature from about 25 to about 30° C.

9. The process according to claim 1, wherein the product of step (a3) is finally cooled to a temperature from about 5 to about 10° C. using a plate heat exchanger.

10. The process according to claim 1, wherein the infusion is carried out using super-heated steam (steps b2, b4) which has a temperature from about 100 to about 250° C.

11. A process for producing low microbial count milk products, comprising the following steps:
    (b1) subjecting a milk product to be reduced in microbes to a temperature in a heat exchanger and heating to temperatures in the range from about 25 to about 30° C. for about 10 to about 30 seconds,
    (b2) heating the product of step (b1) to about 50 to about 60° C. by a first steam infusion,
    (b3) separating off the cream to obtain a skimmed milk product,
    (b4) heating and simultaneously pasteurizing the skimmed milk product of step (b3) to a temperature about 50 to about 75° C. by a second steam infusion, and
    (b5) cooling the pasteurized product of step (b4) by flash cooling.

12. The process according to claim 11, conducted continuously.

13. The process according to claim 11, conducted batchwise.

14. The process according to claim 11, wherein the milk product is heated in a plate heat exchanger (step b1).

15. The process according to claim 11, wherein the infusion (steps b2, b4) is carried out over a period from about 1 to about 5 seconds.

16. The process according to claim 11, wherein the pasteurized product (step b5) is cooled over a period from about 1 to about 5 seconds.

17. The process according to claim 11, wherein the pasteurized product (step b5) is cooled to a temperature from about 25 to about 30° C.

18. The process according to claim 11, wherein the product of step (b5) is finally cooled to a temperature from about 5 to about 10° C. using a plate heat exchanger.

* * * * *